United States Patent [19]
Byrnes

[11] 3,940,356
[45] Feb. 24, 1976

[54] ICE RELEASE AGENTS CONSISTING OF PSEUDO-PLASTIC COMPOSITIONS OF CROSSLINKED POLYACRYLIC ACID IN WATER-POLYGLYCOL MIXTURE

[75] Inventor: Peter G. Byrnes, Bloomfield Hills, Mich.

[73] Assignee: Union Carbide Corporation, New York, N.Y.

[22] Filed: Nov. 29, 1974

[21] Appl. No.: 528,325

[52] U.S. Cl................ 260/29.6 E; 106/13; 252/70; 260/33.4 R; 260/29.6 N
[51] Int. Cl.²............................................ C09K 3/18
[58] Field of Search ..... 260/29.6 E, 29.6 N, 33.4 R; 106/13; 252/70

[56] References Cited
UNITED STATES PATENTS

| | | | |
|---|---|---|---|
| 3,096,290 | 7/1963 | Duane et al. | 106/13 |
| 3,763,071 | 10/1973 | Katze et al. | 260/33.2 R |
| 3,849,361 | 11/1974 | Zweigh | 260/29.6 E |
| 3,865,619 | 2/1975 | Pennewin et al. | 106/13 |

OTHER PUBLICATIONS

Chemical Abstracts Entry–142992b–Vol. 74, 1971 Kordev, et al.

*Primary Examiner*—Joseph L. Schofer
*Assistant Examiner*—Peter F. Kulkosky
*Attorney, Agent, or Firm*—Bernard Francis Crowe

[57] ABSTRACT

Ice release agents are formulated from alkylene glycols having two to three carbon atoms, water, an alkanol and a salt of crosslinked polyacrylic acid.

8 Claims, No Drawings

ICE RELEASE AGENTS CONSISTING OF PSEUDO-PLASTIC COMPOSITIONS OF CROSSLINKED POLYACRYLIC ACID IN WATER-POLYGLYCOL MIXTURE

BACKGROUND OF THE INVENTION

This invention pertains to ice release agents and more particularly to those which allow the facile removal of ice from non-horizontal surfaces.

The adhesion of bonding of ice to various substrates is a problem encountered by main in a large part of the world. Ice formation on automobile windshields, frozen food storage areas, ship superstructures, rolling rock, outdoor functional equipment, and the like has caused the expenditure of considerable time and funds.

A number of solutions to this problem have been suggested in the past including:
1. Methods that reduce or eliminate ice accumulations.
2. Methods that melt or otherwise remove existing accumulations of ice.
3. Methods that attempt to place an effective, permanent ice release coating on the surface of the substrate.
4. Methods that attempt to place an effective, temporary ice release coating on the surface of the substrate.

None of these methods have proved to be a satisfactory solution to this problem. The last method, viz., use of temporary release agents appears to be the most practical and economical but has not been successful for a variety of reasons. For example, Georgal et al. (U.S. Pat. No. 3,362,909) teaches the use of a composition consisting cheifly of n-propanol, water and ethylene glycol. However this composition performs poorly as an ice release agent for the following reasons:
1. The film thickness on a nonhorizontal surface, such as a windshield is too thin to provide for effective reduction of ice adhesion.
2. The evaporation rate of the formultion is too rapid to effect ice release other than for a short length of time after application.
3. The composition is rapidly diluted with water as ice contacts the composition, further reducing its effectiveness.

Goms (U.S. Pat. No. 2,812,264) discloses the use of a composition consisting of organic oils (such as peanut and/or cocoanut oil), aluminum stearates and a minor amount of propylene glycol for use of as an ice release agent for frozen food lockers. This composition has the drawback of high viscosity which requires that it be carefully wiped onto the surface of the substrate in sufficient thickness to assure ease of ice removal. Thus the difficulty in application of this composition has discouraged its use and affords erratic results depending upon the care taken in application. It is also undesirable because of the oily nature of the composition which complicates removal from the ice lockers during clean-up operations.

Ethylene glycol based ice release agents have been used to prevent bonding of ice to airport runways, parking lots, sidewalks and the like and are satisfactory for these horizontal surfaces. However these compositions do not perform effectively on non-horizontal surfaces because their low viscosity allows them to drain off the non-horizontal surfaces by gravity leaving an insufficient quantity of the agent behind to provide effective ice release.

The ideal ice release agent combines inconsistent and seemingly mutually exclusive properties, viz., a low viscosity and an ability to maintain a thick film on non-horizontal surfaces.

It is an object of this invention to provide effective ice release agents which can be easily applied to non-horizontal substrates.

It is another object to provide ice release agents which remain on the non-horizontal substrate surface after application for periods of up to several days before ice accumulation begins.

It is still another object of this invention to provide an ice release agent which is not reduced in effectiveness for long periods of time once ice accumulation has occurred on the non-horizontal substrate.

It is still another object to provide an ice release agent which can be readily removed from the non-horizontal substrate surface if desired.

SUMMARY OF THE INVENTION

An ice release composition which is effective on non-horizontal substrate surfaces has been developed which comprises:
 a. a mixture of an alkylene glycol having two or three carbon atoms and water in a glycol: water ratio of about 20:80 to about 90:10.
 b. about 0.05 to about 1.0 parts of crosslinked polyacrylic acid per 100 parts of (a);
 c. sufficient base to neutralize the crosslinked polyacrylic acid selected from the class consisting of alkali metal hydroxides, ammonium hydroxide, alkyl amines having 4 to 12 carbon atoms, alkanolamines having 2 to 12 carbon atoms and morpholine; and
 d. about 50 to about 200 parts of an alkanol, having one to three carbon atoms, per 100 parts of the combination of (a), (b) and (c).

Representative alkylene glycols include ethylene glycol, 1,2-propylene glycol, and 1,3-propylene glycol.

While a ratio of glycol to water in the range between 20:80 and 90:10 can be used, it is preferred to use a range between 40:60 and 60:40.

Crosslinked polyacrylic acid may be prepared by following the procedure delineated in U.S. Pat. No. 2,923,692, which is incorporated herein by reference, whereby anhydrous acrylic acid is polymerized in an organic medium in the presence of a crosslinking agent which contains a plurality of non-conjugated $CH_2=C<$ groupings per molecule.

Crosslinked polyacrylic acids are commercially available from B. F. Goodrich Chemical Co. as Carbopol resins.

Although about 0.05 to about 1.0 parts of crosslinked polyacrylic acid are used per 100 parts of the mixture of alkylene glycol and water, it is preferred to use a range of about 0.2 to about 0.4 parts.

Exemplary alkali metal hydroxides include sodium hydroxide, potassium hydroxide, and lithium hydroxide.

Representative alkyl amines include the following: dimethylethylamine, diethylmethylamine, triethylamine, diethylpropylamines, dipropylethylamines, tripropylamines, dipropylbutylamines, dibutylpropylamine, tributylamines.

Exemplary alkanolamines include but are not limited to: monoethanolamine, diethanolamine, triethanolamine, N-methylethanolamine, N,N-dimethylethanolamine, N,N-diethylethanolamine, N,N-dipropylethanolamine, N-methyldiethanolamine, N-ethyldiethanolamine, monoisopropanolamine, diisopropanolamine, triisopropanolamine, tributanolamines and the like.

The preferred alkanol is ethanol but one may also employ methanol, isopropanol or n-propanol.

The amount of alkanol used to achieve the desired viscosity of the final composition will normally range from about 35 to about 65 percent of the total composition.

The ice release composition can be applied conveniently to the non-horizontal substrate surface by spraying.

DESCRIPTION OF THE INVENTION

The ice release composition of this invention must adhere to the non-horizontal substrates in order to be effective. This is not possible in a liquid phase and it is therefore essential that a gelled composition be obtained in order to adhere to the particular substrate surface. However in order to apply the gelled composition it must be modified to a form which can be sprayed onto the desired non-horizontal surface. This has been achieved by using the crosslinked polyacrylic acid salt in a particular balanced range with the alkanol and glycol-water mixture.

It was unexpectedly found that the ratio of the components in this invention is narrowly critical and deviations from the quantitative limits set out above affords a combination which either cannot be sprayed, particularly from an aerosol formulation, due to the precipitation of neutralized crosslinked polyacrylic acid or is not effective as an ice release agent. The latter effect arises due to reduced gel strength which results in a decrease of the film thickness of the sprayed combination on a non-horizontal surface.

The complexity of the problem solved by this invention can be attributed in part to the fact that in order to arrive at a gelled combination of alkylene glycol, water and neutralized crosslinked polyacrylic acid which can be sprayed said combination must be thinned with the alkanol. Thinning causes two phenomena to occur simultaneously. Firstly there is the dilution effect with an increase in the volume of the system. Secondly, the polar nature of the system is decreased. In highly polar solvents, such as, pure water, neutralized crosslinked polyacrylic acid is in a highly expanded state. As the polarity of the solvent decreases by the addition of alkanol, there is a contraction of the polyacrylic acid. This polymer contraction reduces gel strength and viscosity ultimately resulting in precipitation of the polymer. The solution of these problems was not one readily apparent to those skilled in the art.

The invention is further described in the examples which follow. All parts and percentages are by weight unless otherwise specified.

EXAMPLE 1

A composition was prepared by mixing 23.23 parts of water, 25.00 parts of ethylene glycol, 0.15 parts of crosslinked poly(acrylic acid), 1.62 parts of N/1 aqueous sodium hydroxide solution and 50 parts of methanol. No settling of solids was obtained with this composition even on centrifuging. This composition when sprayed on an automobile windshield which was then exposed to icing conditions permitted the ice to be removed from the windshield with a minimum of mechanical effort, i.e., no vigorous scraping was required.

This was corroborated by members of a test panel who sprayed this formulation on the windshields of their cars prior to icing conditions. The panel members found this formulation effective against frost, snow, melted and refrozen snow and freezing rain. Plastic windshield scrapers were used with a small amount of mechanical effort.

EXAMPLE 2

The following formulation was compounded:

| | |
|---|---|
| Propylene Glycol | 24.539 parts |
| Deionized $H_2O$ | 23.681 parts |
| Crosslinked Polyacrylic Acid | 0.150 parts |
| N/1 Triisopropanolamine | 1.630 parts |
| Ethanol | 50.000 parts |

This composition can be sprayed from a garden type sprayer for application to commercial food freezers, or formulated as an aerosol using 15 percent by weight dichlorodifluoromethane as the propellant. In this latter case, the dichlorodifluoromethane serves as a further diluent with the ethanol to decrease the viscosity of the composition to the point where it can be applied as an aerosol spray.

EXAMPLE 3

One can also employ a combination of bases and achieve a sprayable composition which does not precipitate crosslinked polyacrylic acid. One such composition comprises 50 parts of a solution containing 50 parts of water,, 50 parts of 1,3-propylene glycol and 0.3 parts of crosslinked polyacrylic acid; 1.575 parts of a solution of 40 grams of sodium hydroxide and 960 grams of water; 0.525 parts of a solution of 87 parts of morpholine and 913 parts of water; and 20 parts of ethanol.

EXAMPLE 4

The possiblity of using a combination of alkanols is demonstrated by the following composition containing 50 parts of a mixture of 50 parts of water, 50 parts of ethylene glycol and 0.3 parts of crosslinked polyacrylic acid; 2.1 parts of a mixture of 40 grams of sodium hydroxide and 960 grams of water; 28 parts of an 80–20 mixture of methanol and isopropanol. This composition was also sprayable and on standing showed no precipitation of crosslinked polyacrylic acid salt.

Although the invention has been described in its preferred forms with a certain degree of particularity, it is understood that the present disclosure of the preferred forms has been made only by way of example and that numerous changes may be resorted to without departing from the spirit and scope of the invention.

What is claimed is:

1. Ice release composition which is effective on non-horizontal substrate surfaces comprising:
    a. a mixture of an alkylene glycol having two to three carbon atoms and water in a glycol:water weight ratio of about 20:80 to about 90:10.
    b. about 0.05 to about 1.0 parts of crosslinked polyacrylic acid per 100 parts of (a);
    c. sufficient base to neutralize the crosslinked polyacrylic acid, said base selected from the class consisting of alkali metal hydroxides, ammonium hydroxide, alkyl amines having 4 to 12 carbon atoms, alkanolamines having 2 to 12 carbon atoms and morpholine; and d. about 50 to about 100 parts of an alkanol, having one to three carbon atoms, per 100 parts of the combination of (a), (b) and (c).

2. Composition claimed in claim 1 wherein the alkylene glycol is ethylene glycol.

3. Composition claimed in claim 1 wherein the alkylene glycol is 1,2-propylene glycol.

4. Composition claimed in claim 1 wherein the base is sodium hydroxide.

5. Composition claimed in claim 1 wherein the base is triisopropanolamine.

6. Composition claimed in claim 4 wherein the alkanol is methanol.

7. Composition claimed in claim 5 wherein the alkanol is ethanol.

8. Composition claimed in claim 1 wherein the alkanol is isopropanol.

* * * * *